(12) United States Patent
Bang

(10) Patent No.: US 12,728,676 B2
(45) Date of Patent: Sep. 8, 2026

(54) INDIRECT TIRE PRESSURE MONITORING APPARATUS AND METHOD THEREOF

(71) Applicant: HL MANDO CORPORATION, Pyeongtaek-si (KR)

(72) Inventor: Jehyun Bang, Uiwang-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 43 days.

(21) Appl. No.: 18/845,341

(22) PCT Filed: Mar. 9, 2023

(86) PCT No.: PCT/KR2023/003213

§ 371 (c)(1),
(2) Date: Sep. 9, 2024

(87) PCT Pub. No.: WO2023/172081

PCT Pub. Date: Sep. 14, 2023

(65) Prior Publication Data

US 2025/0162355 A1 May 22, 2025

(30) Foreign Application Priority Data

Mar. 10, 2022 (KR) ........................ 10-2022-0030147

(51) Int. Cl.
*B60C 23/04* (2006.01)
*G07C 5/06* (2006.01)

(52) U.S. Cl.
CPC ...... *B60C 23/0474* (2013.01); *B60C 23/0488* (2013.01); *G07C 5/06* (2013.01)

(58) Field of Classification Search
None
See application file for complete search history.

(56) References Cited

U.S. PATENT DOCUMENTS

2020/0171892 A1 6/2020 Ga et al.
2022/0144025 A1 * 5/2022 Cho ...................... B60C 23/061

FOREIGN PATENT DOCUMENTS

DE 102019114683 A1 * 6/2020 ......... B60C 23/0474
DE 102020111046 A1 * 4/2021 ........... B60C 23/062
(Continued)

OTHER PUBLICATIONS

DE102019114683 English translation, retrieved from Espacenet on Dec. 12, 2025 (Year: 2025).*
(Continued)

*Primary Examiner* — Amelia Vorce
(74) *Attorney, Agent, or Firm* — Studebaker Brackett PLLC

(57) ABSTRACT

The present disclosure relates to an indirect tire pressure monitoring apparatus. The indirect tire pressure monitoring apparatus includes: a wheel speed sensor for detecting a wheel speed; a reset switch for receiving a reset command for recalibrating the reference value of an indicator used for determining decompression; and a control unit for recalibrating, upon receiving a reset command from the reset switch, the reference value of the indicator according to the wheel speed. The control unit, upon receiving a reset command, compares the reference value of the indicator with a current value to determine whether the tire pressure has been reduced, and prohibits recalibrating the reference value of the indicator if the tire pressure is in a reduced state.

13 Claims, 6 Drawing Sheets

(56) References Cited

FOREIGN PATENT DOCUMENTS

| | | | |
|---|---|---|---|
| EP | 0 897 815 | A2 | 2/1999 |
| JP | 2006-138668 | A | 6/2006 |
| JP | 2008-290480 | A | 12/2008 |
| JP | 2010-143406 | A | 7/2010 |
| JP | 2010-254018 | A | 11/2010 |
| JP | 2013-249024 | A | 12/2013 |
| JP | 2014-223863 | A | 12/2014 |
| JP | 2016-196275 | A | 11/2016 |
| KR | 10-2020-0067648 | A | 6/2020 |
| KR | 10-2021-0042684 | A | 4/2021 |

OTHER PUBLICATIONS

International Search Report issued in PCT/KR2023/003213; mailed Jun. 7, 2023.

The extended European search report issued by the European Patent Office on Nov. 20, 2025, which corresponds to European Patent Application No. 18845341-1009 and is related to U.S. Appl. No. 18/845,341.

An Office Action mailed by the Korean Ministry of Intellectual Property on Dec. 17, 2025, which corresponds to Korean Patent Application No. 10-2022-0030147 and is related to U.S. Appl. No. 18/845,341.

* cited by examiner

INDIRECT TIRE PRESSURE MONITORING APPARATUS AND METHOD THEREOF

CROSS-REFERENCE TO RELATED APPLICATIONS

This application is the U.S. National Stage of International Application No. PCT/KR2023/003213 filed Mar. 9, 2023, which claims benefit of priority to Korean Patent Application No. 10-2022-0030147 filed Mar. 10, 2022, the entire content of which is incorporated herein by reference.

TECHNICAL FIELD

The present disclosure relates to an indirect tire pressure monitoring apparatus for monitoring tire pressure using a wheel speed detected by a wheel speed sensor, and a method thereof.

BACKGROUND ART

An indirect tire pressure monitoring apparatus indirectly estimates relative tire pressure by using a change in a wheel speed output from a wheel speed sensor due to decompression without a tire pressure sensor.

The indirect tire pressure monitoring apparatus performs a recalibration of a reference value of an indicator used for determining decompression by relearning and storing the reference value for a certain period of time when the tire pressure is adjusted. Then, a difference between the stored reference value and a current value is compared to estimate a decompression status of a tire.

When the tire pressure is determined to be low pressure, in order to re-learn the reference value of the indicator used for determining the decompression, a driver should directly press a reset switch that receives a command for recalibrating the reference value after adjusting the tire pressure. However, when the tire pressure is not adjusted to the recommended appropriate tire pressure and the reset switch is pressed, since the reference value of the indicator is re-learned and stored in the low pressure status and the tire pressure status is determined based on the re-learned and stored reference value, it is difficult to accurately determine whether the current state is the decompression status.

DISCLOSURE

Technical Problem

An exemplary embodiment of the present disclosure is to provide an indirect tire pressure monitoring apparatus capable of preventing false detection of tire pressure by prohibiting recalibration of a reference value of an indicator used for determining decompression in a decompression status, and a method thereof.

Technical Solution

According to one aspect of the present disclosure, an indirect tire pressure monitoring apparatus includes: a wheel speed sensor that detects a wheel speed; a reset switch that receives a reset command for recalibrating a reference value of an indicator used for determining decompression; and a control unit that recalibrates the reference value of the indicator according to the wheel speed when the reset command is received from the reset switch, in which when the reset command is received, the control unit compares the reference value of the indicator with a current value to determine whether tire pressure is in a decompression status, and prohibits recalibrating the reference value of the indicator when the pressure is in a decompression status.

The indirect tire pressure monitoring apparatus may further include a display unit that displays a state of recalibrating the reference value of the indicator, in which when the recalibration of the reference value is prohibited, the control unit may display on the display unit that the recalibration of the reference value is prohibited.

When the recalibration of the reference value is prohibited, the control unit may display a method of releasing a prohibition of recalibrating a reference value on the display unit.

When a vehicle is driven at a preset speed or higher after the recalibration of the reference value is prohibited, the control unit may compare the reference value of the indicator with the current value to determine whether the tire pressure is normal, and when the tire pressure is determined to be normal, may release the prohibition of recalibrating the reference value.

The indirect tire pressure monitoring apparatus may further include: a display unit that displays a state of recalibrating the reference value of the indicator, in which when the prohibition of recalibrating the reference value is released, the control unit may display on the display unit that the prohibition of recalibrating the reference value is released.

When the prohibition of recalibrating the reference value is released, the reset command is received from the reset switch, and the vehicle is driven at the preset speed or higher, the control unit may perform the recalibration of the reference value.

The control unit may acquire the indicator using a wheel radius analysis method and a wheel spectrum analysis method.

When a vehicle speed is a reference speed or higher, the control unit may learn the reference value of the indicator.

The control unit may acquire the current value of the indicator based on a wheel speed signal of the wheel speed sensor, and determine whether the tire pressure is in the decompression status based on the acquired current value being smaller than the reference value of the indicator.

The control unit may acquire the current value of the indicator based on a wheel speed signal of the wheel speed sensor, and determine whether the tire pressure is in the decompression status when the acquired current value is smaller than a threshold value smaller than the reference value of the indicator.

According to another aspect of the present disclosure, an indirect tire pressure monitoring method of recalibrating a reference value of an indicator used for determining decompression according to a wheel speed includes: when a reset command for recalibrating the reference value of the indicator is received from a reset switch, comparing the reference value of the indicator with a current value; determining whether tire pressure is in a decompression status according to the comparison result; and when the tire pressure is reduced, prohibiting the recalibration of the reference value of the indicator.

The prohibiting of recalibrating the reference value of the indicator may include displaying on a display unit that the recalibration of the reference value is prohibited.

The prohibiting of recalibrating the reference value of the indicator may include displaying a method of releasing a prohibition of recalibrating a reference value on the display unit.

When a vehicle is driven at a preset speed or higher after the recalibration of the reference value is prohibited, the reference value of the indicator may compare with the current value to determine whether the tire pressure is normal, and when the tire pressure is determined to be normal, the prohibition of recalibrating the reference value may be released.

The releasing of the prohibition of recalibrating the reference value may include displaying on the display unit that the prohibition of recalibrating the reference value is released.

When the prohibition of recalibrating the reference value is released, the reset command is received from the reset switch, and the vehicle is driven at the preset speed or higher, recalibrating the reference value may be performed.

The indirect tire pressure monitoring method may further include: acquiring the indicator using a wheel radius analysis method and a wheel spectrum analysis method.

The indirect tire pressure monitoring method may further include: when a vehicle speed is a reference speed or higher, learning the reference value of the indicator.

The indirect tire pressure monitoring method may further include: acquiring the current value of the indicator based on a wheel speed signal of the wheel speed sensor; and determining whether the tire pressure is in the decompression status based on the acquired current value being smaller than the reference value of the indicator.

The indirect tire pressure monitoring method may further include: acquiring the current value of the indicator based on a wheel speed signal of the wheel speed sensor; and determining whether the tire pressure is in the decompression status when the acquired current value is smaller than a threshold value smaller than the reference value of the indicator.

Advantageous Effects

According to the present disclosure, by prohibiting a recalibration of a reference value of an indicator used for determining decompression even if a reset switch operates in a decompression status, it is possible to prevent a state in which tire pressure is reduced from being erroneously detected as a normal state in a situation where a driver operates the reset switch without adjusting the tire pressure.

BEST MODE

Figure 1:
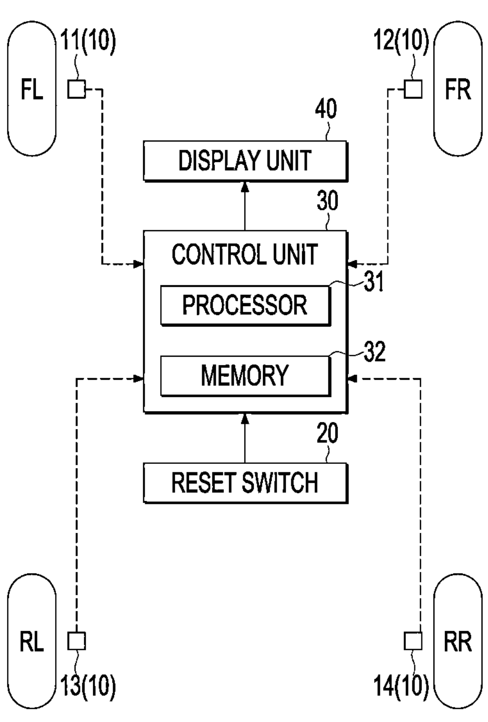
FIG. 1 is a diagram illustrating a schematic configuration of an indirect tire pressure monitoring apparatus according to an exemplary embodiment.

Throughout the specification, the same reference numerals denote the same components. The present specification does not describe all elements of exemplary embodiments, and general content in the technical field to which the present disclosure pertains or content that overlaps between exemplary embodiments will be omitted. The terms "unit, module, member, block" used in the specification may be implemented in software or hardware, and according to exemplary embodiments, a plurality of "units, modules, members, blocks" may be implemented as one component, or one "unit, module, member, block" can also include a plurality of components.

Throughout the specification, "connecting" any part to another part includes not only direct connection but also indirect connection, and the indirect connection includes connection through a wireless communication network.

In addition, unless explicitly described to the contrary, "including" any component will be understood to imply the inclusion of other components rather than the exclusion of other components.

Throughout the specification, when any member is referred to as being positioned "on" another member, it includes not only a case in which any member and another member are in contact with each other, but also a case in which the other member is interposed between any member and another member.

The terms "first," "second," and the like are used to distinguish one element from another element, and the elements are not defined by the above-described terms. Singular forms are intended to include plural forms unless the context clearly makes an exception.

In each step, an identification symbol is used for convenience of description, and the identification symbol does not describe the order of each step, and each step may be performed differently from the specified order unless the specific order is clearly stated in the context.

FIG. 1 is a diagram illustrating a schematic configuration of an indirect tire pressure monitoring apparatus according to an exemplary embodiment.

Referring to FIG. 1, the indirect tire pressure monitoring apparatus may include a wheel speed sensor 10, a reset switch 20, a control unit 30, and a display unit 40.

The wheel speed sensor 10 detects each wheel speed.

The wheel speed sensor 10 may include an FL wheel speed sensor 11 that is installed on a left front wheel FL of a vehicle to detect a speed of the left front wheel FL, an FR wheel speed sensor 12 that is installed on a right front wheel FR to detect a speed of the right front wheel FR, an RL wheel speed sensor 13 that is installed on a left rear wheel RL to detect a speed of the left rear wheel RL, and an RR wheel speed sensor 14 that is installed on a right rear wheel RR to detect a speed of the right rear wheel RR.

The wheel speed sensor 10 may transmit a speed signal of the detected wheel to the control unit 20.

The control unit 30 may receive an analog signal from the wheel speed sensor 10 and convert the received analog signal into digital data through an A/D conversion circuit.

The reset switch 20 is a switch that receives a command for recalibrating a reference value from a driver by relearning and storing the reference value of the indicator used for determining decompression.

The control unit 30 may receive a command for recalibrating the reference value from the reset switch 20.

The display unit 40 may display each tire pressure or a depressurization status according to a control signal of the control unit 30. The display unit 40 may include a low pressure warning light, and may warn that the tire pressure is low by turning on the low pressure warning light.

The display unit 40 may display an operating status of the reset switch 20 according to the control signal of the control unit 30.

The display unit 40 may be a cluster which is an instrument panel that shows various information of a vehicle.

The reset switch 20 and the display unit 40 may be integrated into one device.

The control unit 30 may include a processor 31 and a memory 32.

The processor 31 performs overall control of the indirect tire pressure monitoring apparatus.

The memory 32 may store a program and data for processing the output of the wheel speed sensor 10, and a program and data for learning, estimating, and determining the tire pressure.

The memory 32 may temporarily store detection data received from the wheel speed sensor 10 and the processing result of the detection data of the processor 31.

The memory 32 may include not only volatile memories such as S-RAM and D-RAM, but also non-volatile memory such as flash memory, read only memory (ROM), and erasable programmable read only memory (EPROM).

The indirect tire pressure monitoring apparatus uses signals measured from four wheel speed sensors to determine whether the tire is in low pressure based on the following two methods. One is a method (wheel radius analysis (WRA)) of estimating a dynamic radius change amount by comparing the wheel speed values and estimating tire pressure based on the estimated dynamic radius change amount. The other is a method (wheel spectrum analysis (WSA)) of estimating tire resonance frequency using wheel speed values of each wheel, and independently estimating tire pressure through the estimated resonance frequency. Recently, the two methods have been fused to estimate the tire pressure and/or decompression status.

In general, when the tire pressure decreases, a rotation radius of the tire decreases and the rotation speed increases, compared to the wheel with normal air pressure. Therefore, the rotation radii of each tire may be analyzed through a relative comparison between four wheel speeds of a vehicle, which is effective in detecting low pressure when the air pressure of 1 to 3 tires decreases. However, when the air pressure of all the four tires decreases equally, the low pressure of the tire may not be detected through the relative analysis of the rotation radius. In this case, another method is needed to detect low pressure. When the tire pressure decreases, the stiffness of the tire in a rotation direction decreases, and thus, the tire resonance frequency in the rotation direction decreases. Therefore, the tire resonance frequency may be estimated using the detected wheel speed and compared with the resonance frequency in the normal pressure situation to determine whether the pressure is low, and thus, it may be determined whether the pressure of the four tires is low.

The indicator used for determining the decompression is determined according to the wheel speed detected by the wheel speed sensor, but for the convenience of description, it will be described that the tire resonance frequency according to the wheel speed is used as the indicator used for determining the decompression.

The control unit 30 compares the reference value of the tire resonance frequency, which may be obtained by the frequency analysis of the wheel speed signal detected by the wheel speed sensor 10, with the current value to estimate the tire pressure.

The control unit 30 compares the reference tire resonance frequency in the normal pressure with the current tire resonance frequency by using the fact that the tire resonance frequency changes due to the decompression to estimate the tire pressure and/or decompression status.

The control unit 30 may display the estimated tire pressure and/or decompression status on the display unit 40.

The control unit 30 prohibits recalibrating the reference value of the indicator used for determining the decompression even if the reset switch 20 operates in the decompression status, so it is possible to prevent the state in which the tire pressure is decompressed from being erroneously detected as a normal state in a situation where a driver operates the reset switch 20 without adjusting the tire pressure.

The control unit 30 may display a prohibition status guidance related to the prohibition of recalibrating the reference value of the indicator and information related to a prohibition releasing method on the display unit 40.

Figure 2:
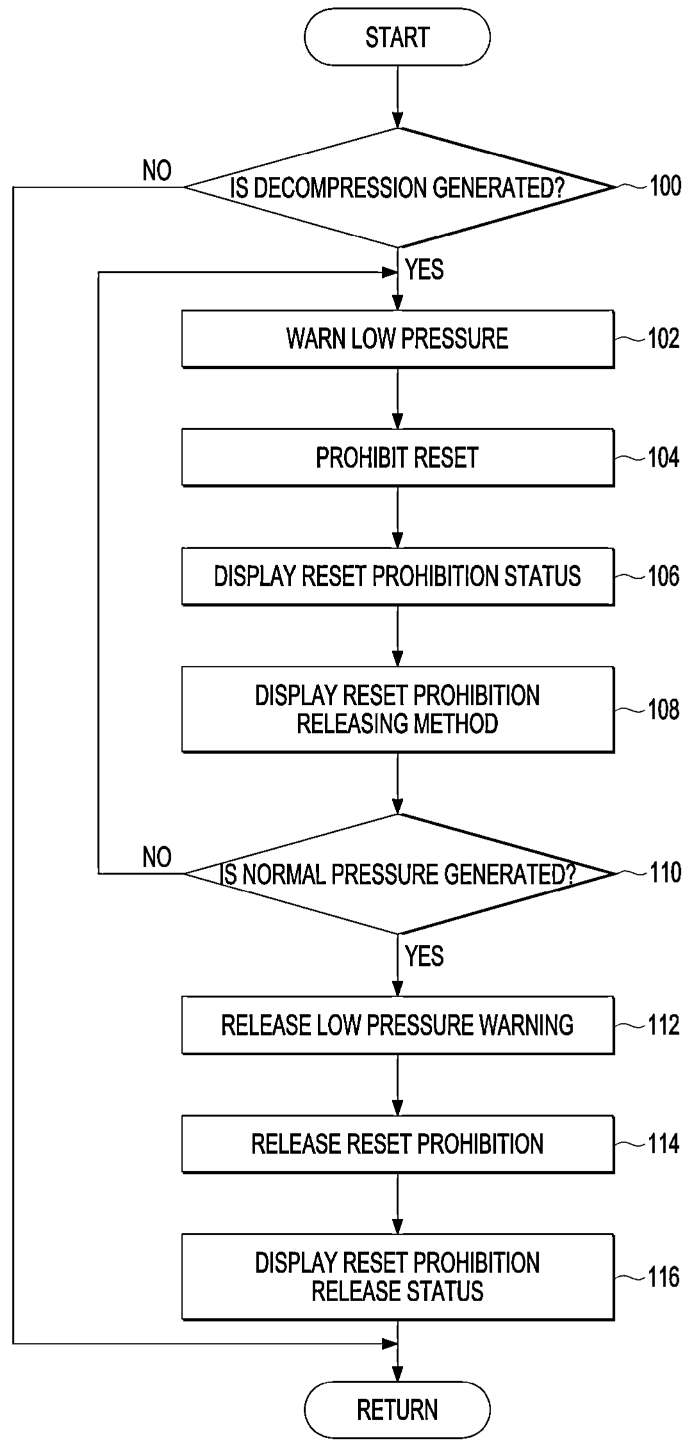
FIG. 2 is a diagram illustrating a control flow of an indirect tire pressure monitoring method according to an exemplary embodiment.

FIG. 2 is a diagram illustrating a control flow of an indirect tire pressure monitoring method according to an exemplary embodiment.

Referring to FIG. 2, the indirect tire pressure monitoring method according to the exemplary embodiment may include determining whether the decompression occurs (100), warning that the tire pressure is low when the decompression occurs (102), prohibiting reset (104), displaying the reset prohibition status (106), displaying the reset prohibition releasing method (108), determining whether the normal pressure occurs (110), releasing the low pressure warning when the normal pressure occurs (112), releasing the reset prohibition (114), and displaying the reset prohibition release status (116).

Figure 3:
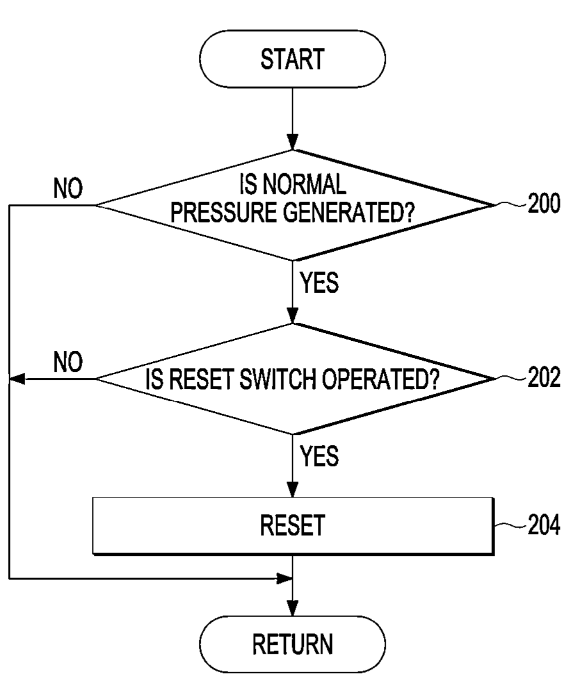
FIG. 3 is a diagram illustrating a control flow according to an operation of a reset switch when tire pressure is normal pressure in the indirect tire pressure monitoring method according to an exemplary embodiment.

FIG. 3 is a diagram illustrating a control flow according to an operation of a reset switch when tire pressure is normal pressure in the indirect tire pressure monitoring method according to an exemplary embodiment.

Referring to FIG. 3, the indirect tire pressure monitoring method according to the exemplary embodiment performs a reset function if the reset switch operates when the tire pressure is normal (200, 202) after the reset prohibition is released (204).

Figure 4:
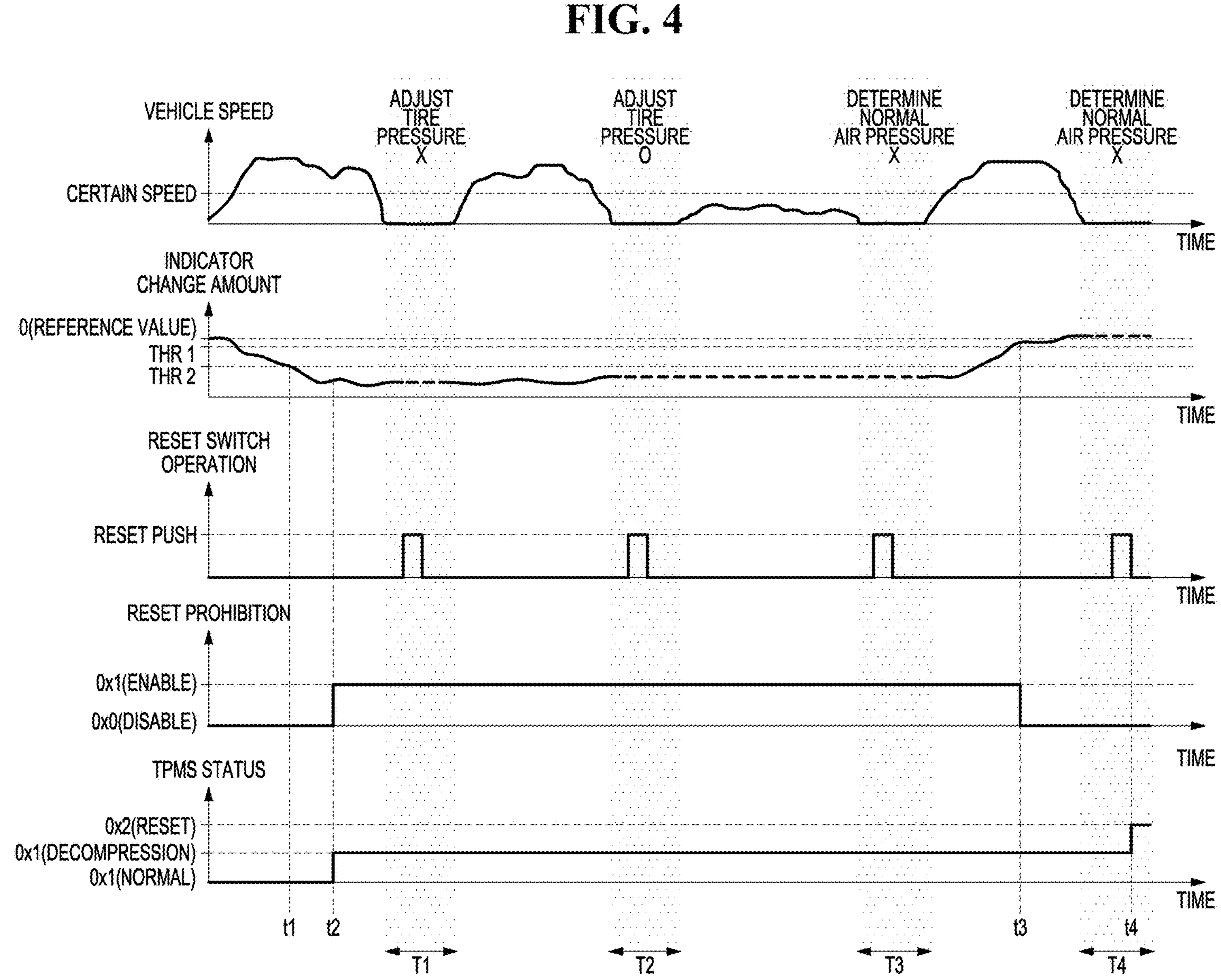
FIG. 4 illustrates timing of a vehicle speed, an indicator change amount, a reset switch operation, a reset prohibition status, a TPMS status, and a vehicle speed for describing a reset prohibition operation in the indirect tire pressure monitoring apparatus according to an exemplary embodiment.

FIG. 4 illustrates timing of a vehicle speed, an amount of change in an indicator, a reset switch operation, a reset prohibition status, a TPMS status, and a vehicle speed for describing a reset prohibition operation in the indirect tire pressure monitoring apparatus according to an exemplary embodiment.

Looking at FIG. 4 with reference to FIGS. 3 and 4, the reference value is recalibrated by learning and storing the reference value of the indicator used for determining the compression for a certain period of time while the vehicle is driving at a certain speed or higher in the learning section which is usually a normal air pressure state.

In order to implement a method of prohibiting recalibration of a reference value of an indicator used for determining decompression in a low pressure status, when the reference value of the indicator learned in the learning section is first used, and the current value of the indicator calculated in real time is greater than or equal to a normal pressure threshold value THR1, it is determined to be the normal air pressure. However, when the current value of the indicator falls below a decompression threshold value THR2 which is lower than the normal pressure threshold value THR1, it is determined to be the decompression.

When the current value of the indicator continues to fall from the reference value as before time t1 and then the current value at time t1 is lower than or equal to the decompression threshold THR2, the tire pressure is estimated to be the decompression status. The WRA method and/or the WSA method may be used to determine the tire decompression.

When the current value at time t1 falls the decompression threshold THR2 or lower, the maintenance time is counted, and at time t2 when the maintenance time has passed a predetermined time, the TPMS status, which is the tire pressure status, changes from "0x0 (normal)" to "0x1 (decompressed)".

Then, by turning on the low pressure warning light on the display unit 40, the driver is warned that the tire pressure is low.

The reset prohibition function is performed depending on the tire pressure status and whether the low pressure warning light is turned on.

At the moment when the TPMS status changes from "0x0 (normal)" to "0x1 (decompressed)" after the low pressure warning light is turned on, the reset prohibition status changes from "0x0 (disable)" to "0x1 (enable)". The reset prohibition function means that even if the driver operates the reset switch 20 for recalibrating the reference value, it returns to the learning section and prohibits the recalibration of the reference value of the indicator. In the reset prohibition status, the "0x0 (disable)" indicates the deactivation of the reset prohibition function, and means that the reset operation by the reset switch 20, i.e., the operation of recalibrating the reference value, is permitted. The "0x1 (enable)" indicates the activation of the reset prohibition function, and means that the reset operation by the reset switch 20, i.e. the operation of recalibrating the reference value is prohibited.

At the time t2 when the TPMS status changes from "0x0 (normal)" to "0x1 (decompressed)", the reset prohibition status changes from "0x0 (disable)" to "0x1 (enable)" to activate the reset prohibition, thereby prohibiting the reset operation by the reset switch 20. In other words, even if the driver operates the reset switch 20, the recalibration of the reference value is not performed. As in the T1 section, even if the reset switch 20 is pushed in a section where the tire pressure is not adjusted, since the reset prohibition status is "0x1 (enable)", the reset prohibition is continuously activated and thus the reset by the reset switch 20 is prohibited, so the recalibration of the reference value is not performed.

When the reset prohibition status changes from "0x0 (disable)" to "0x1 (enable)", the reset prohibition status may be displayed on the display unit 40. In this case, the reset prohibition releasing method may be displayed on the display unit 40. A message for the reset prohibition releasing method may be displayed to induce the driver to perform the reset prohibition releasing operation. For reference, when the reset prohibition status is changed from "0x0 (disable)" to "0x1 (enable)", the control unit 30 provides an enable signal of the reset prohibition function to an upper system of the vehicle through communication so that the upper system may inform the driver that the current status is the reset prohibition status and of the reset prohibition releasing method, thereby informing the driver that the recalibration of the reference value is in the prohibited status and how to operate the vehicle to release the recalibration of the reference value. The reset prohibition releasing method may include operating, by the driver, the reset switch 20 while driving the vehicle at a certain speed or higher for a certain period of time after adjusting the tire pressure.

The reset operation is prohibited from time t2 to time t3 which is after the decompression determination and before the normal air pressure determination.

In the T2 section where the tire pressure is adjusted by the driver after the low pressure warning light is turned on, even if the driver pushes the reset switch 20 after adjusting the tire pressure, the reset prohibition may not be released by immediately changing the reset prohibition status from "0x1 (enable)" to "0x0 (disable)". First, in order to calculate the status after the tire pressure adjustment in real time, the vehicle should be driven at a certain speed or higher, and the reset prohibition may be released only when the current value of the indicator calculated in real time exceeds the normal pressure threshold value THR1.

As in the T3 section, when the vehicle is driven at a speed lower than a certain speed, the operation of comparing the current value of the indicator and the normal pressure threshold value THR1 to determine whether the tire pressure is the normal air pressure is not performed.

When the current value of the indicator is greater than or equal to the normal pressure threshold value THR1 at time t3, the reset prohibition status is released by changing the reset prohibition status from "0x1 (enable)" to "0x0 (disable)".

When the reset prohibition status changes from "0x1 (enable)" to "0x0 (disable)", it is possible to display on the display unit 40 that the reset prohibition is released. For reference, when the reset prohibition status is changed from "0x1 (enable)" to "0x0 (disable)", the control unit 30 provides the disable signal of the reset prohibition function to the upper system of the vehicle through communication, so that the upper system may inform the driver that the current status is in the reset prohibition release state, thereby guiding the driver to perform the recalibration of the reference value by pushing the reset switch 20.

In the T4 section where the reset switch 20 is pushed after the reset prohibition is released, the vehicle is driven at a speed lower than a certain speed, so the operation of comparing the current value of the indicator with the normal pressure threshold value THR1 to determine whether the tire pressure is the normal air pressure is not performed, and when the vehicle is driven at a certain speed or higher, the operation of comparing the current value of the indicator with the normal pressure threshold value THR1 to determine whether the tire pressure is the normal air pressure is performed, and when the current value exceeds the normal pressure threshold value THR1, the operation of recalibrating the reference value is performed to recalibrate the reference value of the indicator.

Figure 5:
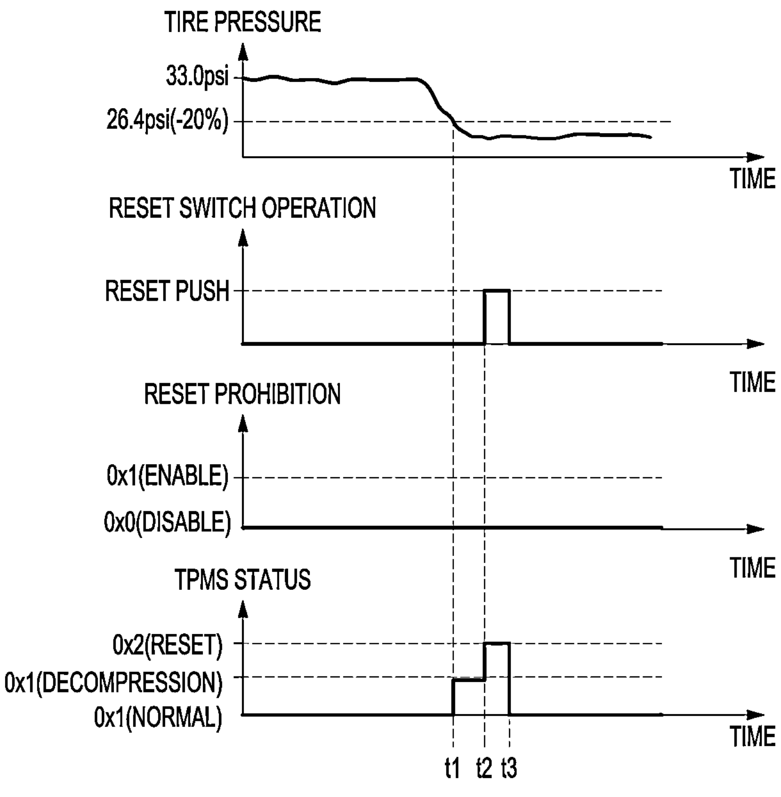
FIG. 5 is a diagram illustrating timing of the tire pressure, the reset switch operation, the reset prohibition status, and the TPMS status before applying the reset prohibition in the indirect tire pressure monitoring apparatus according to an exemplary embodiment.
Figure 6:
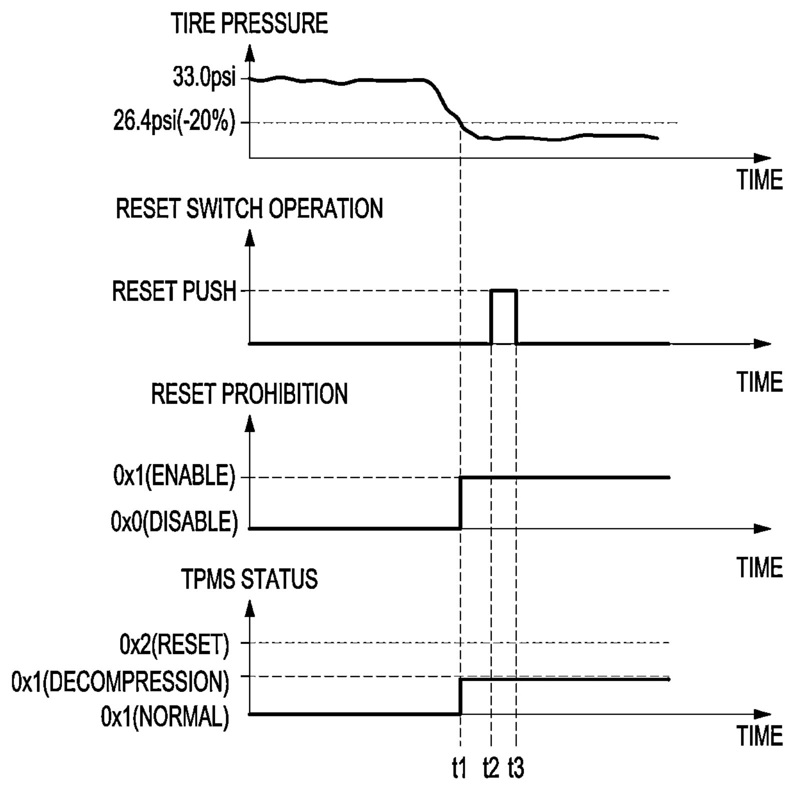
FIG. 6 is a diagram illustrating timing of the tire pressure, the reset switch operation, the reset prohibition status, and the TPMS status after applying the reset prohibition in the indirect tire pressure monitoring apparatus according to an exemplary embodiment.

FIG. 5 is a diagram illustrating timing of the tire pressure, the reset switch operation, the reset prohibition status, and the TPMS status before applying the reset prohibition in the indirect tire pressure monitoring apparatus according to an exemplary embodiment, and FIG. 6 is a diagram illustrating timing of the tire pressure, the reset switch operation, the reset prohibition status, and the TPMS status after applying the reset prohibition in the indirect tire pressure monitoring apparatus according to an exemplary embodiment.

As illustrated in FIG. 5, when the vehicle set to the normal air pressure (33 psi) is decompressed to 20% or less (=26.4 psi) of the European regulation standard, the TPMS status at time t1 changes from "0x0 (normal)" to "0x1 (decompressed)" and the low pressure warning light on the cluster is turned on.

When the driver pushes the reset switch 20 at time t2 in the decompression status in which the air pressure is 20% or less, conventionally, the reset prohibition status is "0x0 (disable)", so the recalibration of the reference value is performed. Therefore, conventionally, since the reference value of the indicator is recalibrated based on the current status of 26.4 psi or less, the current decompressed status is determined to be normal, so the TPMS status changes from "0x1 (decompressed)" to "0x0 (normal)" at time t3. In this case, not only is the current status of 26.4 psi or less not determined as decompression, but even if 10% is additionally decompressed (=23.7 psi), it is not determined as decompression.

As illustrated in FIG. 6, when the reset prohibition function is activated to improve this, since the reset prohibition status changes from "0x0 (disable)" to "0x1 (enable)" at the moment when the TPMS status changes from "0x0 (normal)" to "0x1 (decompressed)" at time t1, even if the driver pushes the reset switch 20 at time t2 in this state, the recalibration of the reference value based on the current state of 26.4 psi or less may be prohibited.

Therefore, the present disclosure may prohibit the recalibration of the reference value in the low pressure state, so the it is possible to prevent the state in which the tire pressure is decompressed from being erroneously detected as a normal state in the situation where the driver operates the reset switch without adjusting the tire pressure.

Meanwhile, the above-described exemplary embodiment has described the use of the tire resonance frequency as the indicator used for determining decompression, but is not limited thereto, and instead of the tire resonance frequency as the indicator used for determining decompression, a single or combination of relative dynamic radius differences according to a wheel speed, such as a relative dynamic radius difference between the left front FL tire and the left rear RL tire, a relative dynamic radius difference between the left front FL tire and the right front FR tire, a relative dynamic radius difference between the right front FR tire and the right rear RR tire, and a relative dynamic radius difference between the left rear RL tire and the right rear RR tire, may also be used.

Meanwhile, the above-described control unit and/or its components may include one or more processors/microprocessors(s) coupled with a computer-readable recording medium storing computer-readable codes/algorithms/software. The processors/microprocessors(s) may execute the computer-readable codes/algorithms/software stored on the computer-readable recording medium to perform the above-described functions, operations, steps, etc.

The above-described control unit and/or its components may further include a memory implemented as a computer-readable non-transitory recording medium or a computer-readable temporary recording medium. The memory may be controlled by the above-described control unit and/or its components, and may be configured to store data transmitted to or received from the above-described control unit and/or its components, or may be configured to store data processed or to be processed by the above-described control unit and/or its components.

The disclosed exemplary embodiments may also be implemented as the computer-readable codes/algorithms/software on the computer-readable recording medium. The computer-readable recording medium may be the computer-readable non-transitory recording medium, such as a data storage device that may store data that may be read by the processor/microprocessor. Examples of the computer-readable recording medium include a hard disk drive (HDD), a solid-state drive (SSD), a silicon disk drive (SDD), a read-only memory (ROM), a CD-ROM, a magnetic tape, a floppy disk, an optical data storage device, etc.

The invention claimed is:

1. An indirect tire pressure monitoring apparatus, comprising:
- a wheel speed sensor configured to detect a wheel speed;
- a reset switch configured to receive a reset command for recalibrating a reference value of an indicator used for determining decompression; and
- a control unit configured to recalibrate the reference value of the indicator according to the wheel speed when the reset command is received from the reset switch,
- wherein the control unit is configured to:
- control a display unit to display a state of recalibrating the reference value of the indicator;
- when the reset command is received, compare the reference value of the indicator with a current value to determine whether tire pressure is in a decompression status, and prohibit recalibrating the reference value of the indicator when the tire pressure is in the decompression status; and
- when the recalibration of the reference value is prohibited, display a method of releasing the prohibition of recalibrating the reference value on the display unit.

2. The indirect tire pressure monitoring apparatus of claim 1,
- wherein when the recalibration of the reference value is prohibited, the control unit is configured to display on the display unit that the recalibration of the reference value is prohibited.

3. The indirect tire pressure monitoring apparatus of claim 1, wherein when a vehicle is driven at a preset speed or higher after the recalibration of the reference value is prohibited, the control unit is configured to compare the reference value of the indicator with a current value to determine whether the tire pressure is normal, and when the tire pressure is determined to be normal, release the prohibition of recalibrating the reference value.

4. The indirect tire pressure monitoring apparatus of claim 3, further comprising:
- the display unit configured to display a state of recalibrating the reference value of the indicator,
- wherein when the prohibition of recalibrating the reference value is released, the control unit is configured to display on the display unit that the prohibition of recalibrating the reference value is released.

5. The indirect tire pressure monitoring apparatus of claim 1, wherein the control unit is configured to perform, when the prohibition of recalibrating the reference value is released, the reset command is received from the reset switch, and a vehicle is driven at a preset speed or higher, recalibrating the reference value.

6. The indirect tire pressure monitoring apparatus of claim 1, wherein the control unit is configured to acquire the current value of the indicator based on a wheel speed signal of the wheel speed sensor, and determine whether the tire pressure is in the decompression status based on the acquired current value being smaller than the reference value of the indicator.

7. The indirect tire pressure monitoring apparatus of claim 1, wherein the control unit is configured to acquire the current value of the indicator based on a wheel speed signal of the wheel speed sensor, and determine whether the tire pressure is in the decompression status when the acquired current value is smaller than a threshold value smaller than the reference value of the indicator.

8. An indirect tire pressure monitoring method of recalibrating a reference value of an indicator used for determining decompression according to a wheel speed, the indirect tire pressure monitoring method comprising:

when a reset command for recalibrating the reference value of the indicator is received from a reset switch, comparing the reference value of the indicator with a current value;

determining whether tire pressure is in a decompression status according to the comparison result; and when the tire pressure is reduced, prohibiting recalibrating the reference value of the indicator, wherein the prohibiting of recalibrating the reference value of the indicator includes displaying a method of releasing the prohibition of recalibrating the reference value on a display unit.

9. The indirect tire pressure monitoring method of claim 8, wherein the prohibiting of recalibrating the reference value of the indicator includes displaying on the display unit that the recalibrating of the reference value is prohibited.

10. The indirect tire pressure monitoring method of claim 8, further comprising, when a vehicle is driven at a preset speed or higher after the recalibration of the reference value is prohibited, determining whether the tire pressure is normal by comparing the reference value of the indicator with the current value, and when the tire pressure is determined to be normal, releasing the prohibition of recalibrating the reference value.

11. The indirect tire pressure monitoring method of claim 10, wherein the releasing of the prohibition of recalibrating the reference value includes displaying on the display unit that the prohibition of recalibrating the reference value is released.

12. The indirect tire pressure monitoring method of claim 8, further comprising performing, when the prohibition of recalibrating the reference value is released, the reset command is received from the reset switch, and a vehicle is driven at a preset speed or higher, the recalibrating of the reference value.

13. The indirect tire pressure monitoring method of claim 8, further comprising:

acquiring the current value of the indicator based on a wheel speed signal of the wheel speed sensor;

determining whether the tire pressure is in the decompression status based on the acquired current value being smaller than the reference value of the indicator; and determining whether the tire pressure is in the decompression status when the acquired current value is smaller than a threshold value smaller than the reference value of the indicator.

* * * * *